(12) United States Patent  
Ryu (10) Patent No.: US 8,804,212 B2  
(45) Date of Patent: Aug. 12, 2014

(54) STEPPING MOTOR CONTROL DEVICE CAPABLE OF REDUCING LOAD ON CPU

(75) Inventor: Gunmmun Ryu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 1073 days.

(21) Appl. No.: 12/125,660

(22) Filed: May 22, 2008

(65) Prior Publication Data

US 2008/0291513 A1 Nov. 27, 2008

(30) Foreign Application Priority Data

May 23, 2007 (JP) ................................. 2007-136640  
Mar. 26, 2008 (JP) ................................. 2008-081517

(51) Int. Cl.  
*H04N 1/04* (2006.01)

(52) U.S. Cl.  
USPC .......................................... 358/498; 358/474

(58) Field of Classification Search  
None  
See application file for complete search history.

(56) References Cited

U.S. PATENT DOCUMENTS

| | | | | |
|---|---|---|---|---|
| 3,761,880 A * | 9/1973 | Kritz et al. | ............... | 400/124.04 |
| 4,159,882 A * | 7/1979 | Sanders et al. | ............... | 400/555 |
| 4,811,052 A * | 3/1989 | Yamakawa et al. | ............. | 399/77 |
| 4,839,791 A * | 6/1989 | Ito | ................................... | 710/56 |
| 4,991,972 A * | 2/1991 | Ikenoue et al. | ............... | 358/1.14 |
| 5,583,410 A * | 12/1996 | Jacobson et al. | ............. | 318/696 |
| 5,648,836 A * | 7/1997 | Sato et al. | ........................ | 396/86 |
| 5,674,012 A * | 10/1997 | Sasaki | ............................. | 400/61 |
| 5,887,125 A * | 3/1999 | Takano et al. | ................ | 358/1.12 |
| 5,963,005 A * | 10/1999 | Yamaji | .......................... | 318/685 |
| 6,141,110 A * | 10/2000 | Isozaki | ......................... | 358/1.12 |
| 6,191,871 B1 * | 2/2001 | Miyamoto | ..................... | 358/486 |
| 6,256,699 B1 * | 7/2001 | Lee | ................................. | 710/310 |
| 6,311,237 B1 * | 10/2001 | Suzuki et al. | ................... | 710/52 |
| 6,745,320 B1 * | 6/2004 | Mitsuishi | ....................... | 712/225 |
| 6,763,448 B1 * | 7/2004 | Mitsuishi | ......................... | 712/39 |
| 7,615,961 B2 * | 11/2009 | Kobayashi et al. | ........... | 318/685 |
| 7,916,316 B2 * | 3/2011 | Saikawa | ....................... | 358/1.14 |
| 2004/0268136 A1 * | 12/2004 | Mitsuishi | ....................... | 713/189 |
| 2005/0057209 A1 | 3/2005 | Andoh et al. | | |
| 2007/0189815 A1 | 8/2007 | Andoh et al. | | |
| 2007/0290635 A1 * | 12/2007 | Yoshida | .......................... | 318/66 |
| 2008/0012523 A1 * | 1/2008 | Kobayashi et al. | ........... | 318/696 |
| 2010/0141999 A1 * | 6/2010 | Akahane | ...................... | 358/1.16 |
| 2010/0214628 A1 * | 8/2010 | Tsai | .............................. | 358/474 |

FOREIGN PATENT DOCUMENTS

| | | |
|---|---|---|
| JP | 8149889 | 6/1996 |
| JP | 2000-014194 A | 1/2000 |
| JP | 2000276435 | 10/2000 |
| JP | 2004-072971 A | 4/2003 |
| JP | 2007-068283 A | 3/2007 |
| JP | 2007-124790 A | 5/2007 |

* cited by examiner

*Primary Examiner* — Marcus T Riley  
(74) *Attorney, Agent, or Firm* — Ditthavong & Steiner, P.C.

(57) ABSTRACT

A stepping motor control device comprises a plurality of buffers for storing data for driving a stepping motor, a read unit for reading the data from the buffer, and a write unit for writing the data in the buffer. The write unit includes a first mode for writing the data in the buffer in a process performed in a predetermined order, and a second mode for writing the data in the buffer in response to a request from the read unit to write the data.

9 Claims, 6 Drawing Sheets

STEPPING MOTOR CONTROL DEVICE CAPABLE OF REDUCING LOAD ON CPU

BACKGROUND OF THE INVENTION

1. Field of the Invention

The present invention relates to a stepping motor control device capable of reducing the load on a CPU and more particularly, to a stepping motor control device used in an image forming apparatus.

2. Description of the Related Art

In an image forming apparatus, a stepping motor is used as a feeding motor for transporting a sheet in conjunction with image forming. The rotation speed of the stepping motor is controlled by a stepping motor control device. Here, when the rotation speed of the stepping motor is abruptly changed, the stepping motor could be step-out. Therefore, the stepping motor control device is required to control the start and stop of the stepping motor smoothly.

According to a conventional stepping motor control device, one buffer is provided in an ASIC (Application Specific Integrated Circuit). A CPU (Central Processing Unit) writes pulse cycle data that shows a cycle to output a pulse for driving the stepping motor, in the buffer. The ASIC reads the data written in the buffer and outputs the pulse based on the data. The pulse cycle data written in the one buffer is for one step to rotate the stepping motor to a certain angle. In order to start and stop the stepping motor smoothly, data for the plurality of steps are needed.

At this time, when writing of data for one step of the plurality of steps is delayed, for example, the stepping motor cannot be started and stopped smoothly. Therefore, it is necessary to write the data without any delay.

Here, a technique to write data in the plurality of buffers is disclosed in Japanese Unexamined Patent Publication No. 8-149889 and Japanese Unexamined Patent Publication No. 2000-276435.

According to the Japanese Unexamined Patent Publication No. 8-149889, a plurality of buffers is divided into a write target buffer group and a read target buffer group. Data is written while data is read from the read target buffer group. When the data reading from the read target buffer group is completed, the read target buffer and the write target buffer groups are replaced.

Here, the data cannot be written until the data reading from the read target buffer group is completed. In this case, since it is necessary to write the data in the plurality of write target buffers collectively, the load on a CPU is increased and the data writing could be delayed.

According to the Japanese Unexamined Patent Publication No. 2000-276435, a plurality of buffers are divided into a first buffer group in which data outputted from a processor is written and a second buffer group in which data outputted from the first buffer is written. The data writing in the first buffer group is determined based on ON/OFF of a transmission interrupt signal and performed in an interrupt process.

Here, since the data writing is performed in the interrupt process, when the number of the data writing operations is increased, the number of the interrupt processes is increased, so that the load on a CPU is increased.

SUMMARY OF THE INVENTION

It is an object of the present invention to provide a stepping motor control device capable of reducing the load on a CPU and writing data smoothly without any delay.

It is another object of the present invention to provide an image forming apparatus capable of forming a good image.

It is still another object of the present invention to provide a stepping motor superior in control performance.

It is still another object of the present invention to provide a method for controlling the stepping motor capable of reducing the load on a CPU and writing data smoothly without any delay.

A stepping motor control device according to the present invention comprises a plurality of buffers for storing data for driving a stepping motor, a read unit for reading the data from the buffer, and a write unit for writing the data in the buffer. The write unit includes a first mode for writing the data in the buffer in a process performed in a predetermined order, and a second mode for writing the data in the buffer in response to a request from the read unit to write the data.

According to the present invention, the stepping motor control device writes the data for driving the stepping motor in the process performed in the predetermined order and writes the data in response to the request from the read unit to write the data. As a result, the number of data writing performed in response to the request can be reduced. Thus, the load on the CPU can be reduced and the data can be written smoothly without any delay.

Preferably, the write unit includes a write buffer determination unit for determining the buffer in which the data can be written, based on a write position register designating the buffer to be used for the data writing among the plural buffers.

Further preferably, the read unit includes a read buffer determination unit for determining the buffer in which the data can be read, based on a read position register designating the buffer to be used for the data reading among the plural buffers.

Still further preferably, the write unit writes the data in a ring buffer mode.

According to another aspect of the present invention, an image forming apparatus comprising the stepping motor control device described above.

Since the image forming apparatus comprises the above-described stepping motor control device, the control quality of the stepping motor can be improved and a good image can be formed.

Preferably, the image forming apparatus comprises an image forming unit for forming an image, a feeding roller for transporting a sheet to the image forming unit, and a stepping motor for rotating the feeding roller. The stepping motor is controlled by the stepping motor control device.

Further preferably, the stepping motor control device controls the feeding roller rotated by the stepping motor so as to speed up and slow down.

Still preferably, the image forming apparatus further comprises a transfer belt for forming a visible image thereon by rotation and a stepping motor for rotating the transfer belt. The stepping motor is controlled by the stepping motor control device.

Further preferably, the stepping motor control device controls the rotation speed of the transfer belt rotated by the stepping motor so as to keep it constant.

According to still another aspect of the present invention, a stepping motor comprises the above-described stepping motor control device.

Since the stepping motor comprises the above-described stepping motor control device, the load on the CPU can be reduced and the data can be written smoothly without any delay.

According to still another aspect of the present invention, a stepping motor control device controls a stepping motor by a CPU performing a steady process and an interrupt process. The stepping motor control device comprises a plurality of buffers. The stepping motor is driven based on the data written in the plurality of buffers. The stepping motor control device writes the data in the plurality of buffers in the steady process.

Thus, the stepping motor control device writes the data for driving the stepping motor in the steady process. As a result, it is not necessary to write the data in the interrupt process, the load on the CPU can be reduced and the data can be written smoothly without any delay.

According to still another aspect of the present invention, a method for controlling a stepping motor is implemented by reading data written in a plurality of buffers with a read unit. It comprises a write step of writing data for driving the stepping motor in the plurality of buffers. The write step includes a step of writing the data in the buffer in a process performed in a predetermined order and a step of writing the data in the buffer in response to a data write request from the read unit.

Thus, according to the method for controlling the stepping motor, the data for driving the stepping motor is written according to the process performed in the predetermined order, and the data is written in response to the data write request from the read unit. As a result, the number of the data writings can be reduced due to the request. As a result, the load on the CPU can be reduced and the data can be written smoothly without any delay.

DESCRIPTION OF THE PREFERRED EMBODIMENTS

Figure 1:
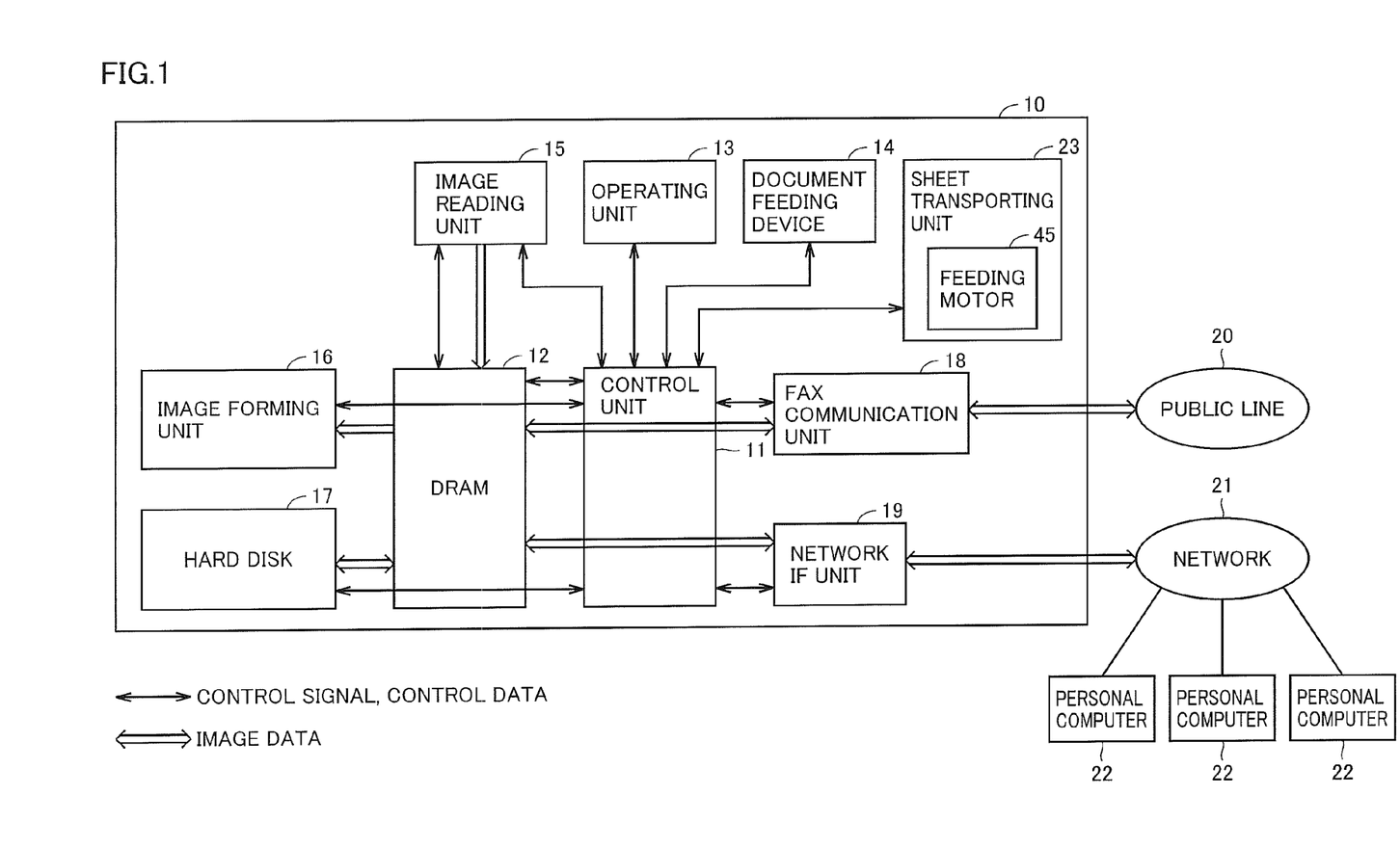
FIG. 1 is a block diagram showing a whole construction of a multifunctional printer according to one embodiment of the present invention.

An embodiment of the present invention will be described with reference to the drawings hereinafter. FIG. 1 is a block diagram showing the construction of a multifunctional printer 10 to which an image forming apparatus according to one embodiment of the present invention is applied. Referring to FIG. 1, the multifunctional printer 10 includes a control unit 11 for controlling the whole of the multifunctional printer 10, a DRAM 12 for storing image data and the like to be written and to be read, an operating unit 13 having a display screen for displaying information stored in the multifunctional printer 10 and serving as an interface in the multifunctional printer 10 with a user, a document feeding device 14 for automatically transporting a document to a predetermined read position, an image reading unit 15 for reading the image of the document transported by the document feeding device 14 at the predetermined read position by a scanner, an image forming unit 16 for forming the image of the document read by the image reading unit 15, a sheet transporting unit 23 for automatically transporting the sheet to the image forming unit 16, a hard disk 17 for storing the image data and the like, a FAX communication unit 18 connected to a public line 20, and a network IF (interface) unit 19 connected to a network 21.

The control unit 11 performs compression coding on the document data supplied from the image reading unit 15 and writes it in the DRAM 12, reads the data written in the DRAM 12, and performs decompression decoding on the data to be outputted from the image forming unit 16.

The multifunctional printer 10 serves as a copy machine when it forms an image at the image forming unit 16 through the DRAM 12 based on the document read by the image reading unit 15. In addition, the multifunctional printer 10 serves as a printer when it forms an image at the image forming unit 16 through the DRAM 12 based on image data transmitted from a personal computer 22 connected to the network 21. Furthermore, the multifunctional printer 10 serves as a fax machine when it forms an image at the image forming unit 16 through the DRAM 12 based on image data transmitted from the public line 20 through the FAX communication unit 18, or when it transmits image data to the public line 20 through the FAX communication unit 18 based on the image data of a document read by the image reading unit 15. More specifically, the multifunctional printer 10 is an image processor and has a plurality of functions such as a copy function, a printer function, and a FAX function. Furthermore, each function has a function that can be set more precisely.

In addition, in FIG. 1, thick arrows show the flow of the image data and thin arrows show the flow of a control signal or control data.

Figure 2:
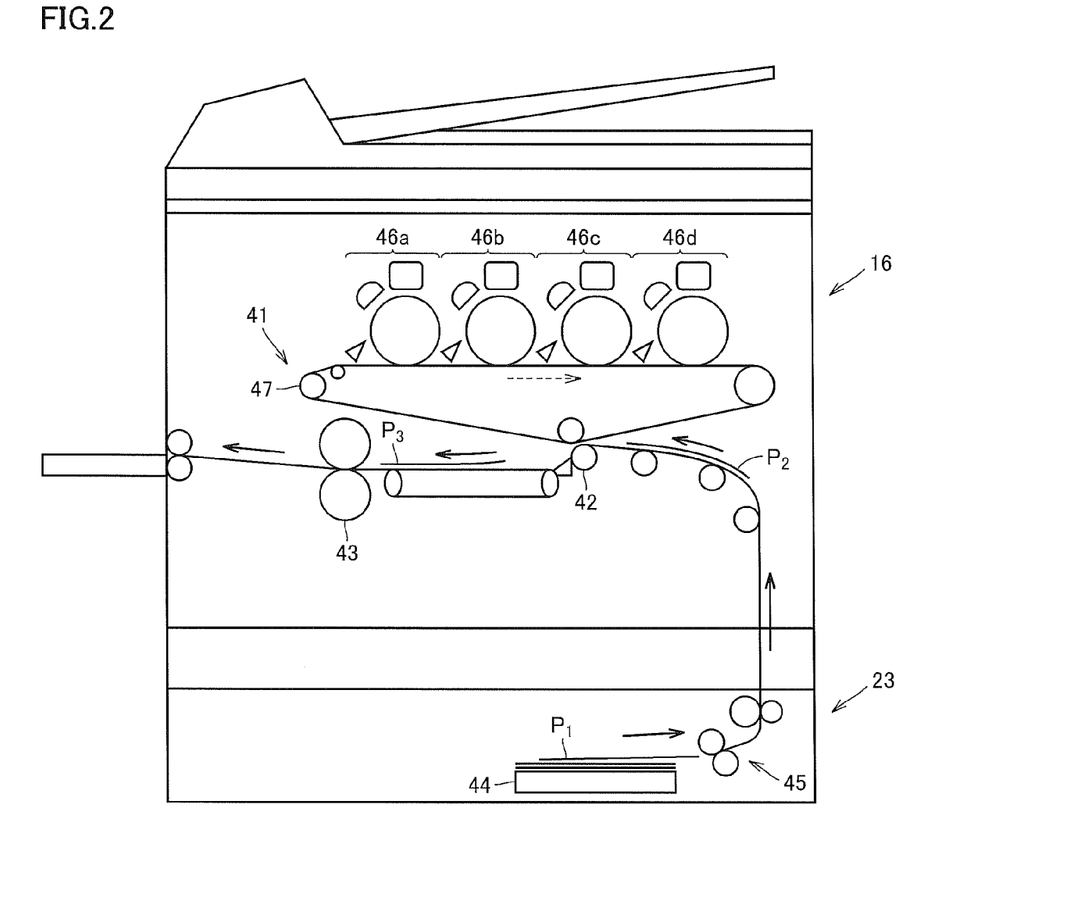
FIG. 2 is a schematic view showing a part of an image forming unit provided in the multifunctional printer shown in FIG. 1.
Figure 3:
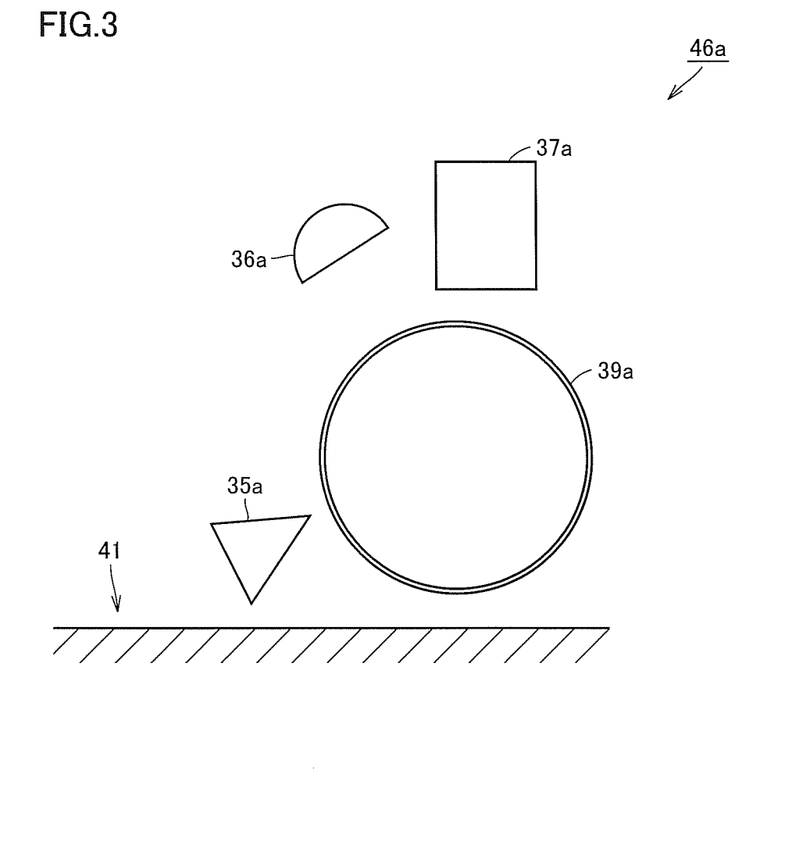
FIG. 3 is a schematic view showing one example of a developing device provided in the image forming unit shown in FIG. 2.

Here, the specific construction of the image forming unit 16 will be described. FIG. 2 is a schematic view showing a part of the image forming unit 16 provided in the multifunctional printer 10. In FIG. 2, solid arrows show the flow of a sheet 44, and a dotted arrow shows the rotation direction of a transfer belt 41. FIG. 3 is a schematic view showing an example of a developing device 46a for yellow provided in the image forming unit 16 shown in FIG. 2. Referring to FIGS. 1 to 3, the image forming unit 16 includes the developing device 46a for yellow, a developing device 46b for magenta, a developing device 46c for cyan, and a developing device 46d for black. The developing device 46a for yellow includes a photoreceptor 39a, a charging unit 35a, an exposing unit 36a, and a developing unit 37a. The charging unit 35a applies a voltage to the photoreceptor 39a to charge the surface of the photoreceptor 39a to a predetermine potential. The exposing unit 36a exposes the surface of the photoreceptor 39a that was charged by the charging unit 35a, to a yellow photo image formed according to the document read by the image reading unit 15. Thus, an electrostatic latent image is formed on the surface of the photoreceptor 39a. The developing unit 37a attaches yellow toner to the electrostatic latent image formed on the surface of the photoreceptor 39a to form a yellow toner image. The developing unit 46b, the developing unit 46c and the developing unit 46d form corresponding color toner images similar to the developing unit 46a respectively. The formed toner images of the colors are laminated as primary transfer on the transfer belt 41 rotating in the direction shown by the dotted arrows in FIG. 2, in the order of yellow, magenta, cyan, and black without causing color shift. Thus, a visible full-color image comprising yellow, magenta, cyan, and black is formed on the transfer belt 41. The full-color image formed on the transfer belt 41 is secondly transferred to the sheet 44 by a transfer roller 42. More specifically, the sheet 44 is transported from a position shown by $P_1$ to the direction shown by the solid arrow in FIG. 2, that is, to the image forming unit 16 by a feeding motor 45 provided in the sheet transporting unit 23. When the sheet 44 is transported to a position shown by $P_2$ and reaches the transfer roller 42, the full-color image is secondly transferred onto the sheet 44 by the transfer roller 42. Then, when the sheet 44 is transported to a position shown by $P_3$ and reaches a fixing roller 43, the full-color image transferred on the sheet 44 is fixed by the fixing roller 43. As a result, the full-color image is formed on the sheet 44.

Figure 4:
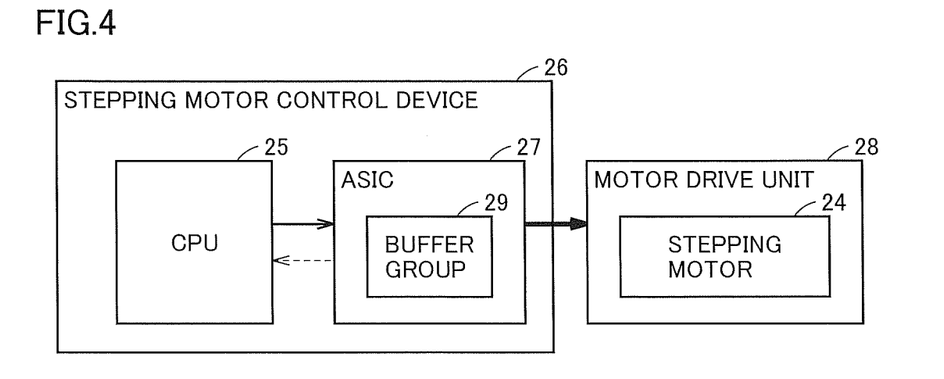
FIG. 4 is a block diagram showing the constructions of a stepping motor control device and a motor driving unit.

The above feeding motor 45 is a stepping motor in which its rotation speed is adjusted according to the transportation timing of the sheet 44 and it is controlled by a stepping motor control device. Here, the specific construction of the stepping motor control device will be described. FIG. 4 is a block diagram showing the construction of a stepping motor control device 26 and a motor drive unit 28. Referring to FIGS. 1 to 4, the stepping motor control device 26 comprises a CPU 25 and an ASIC 27. The ASIC 27 comprises a buffer group 29 consisting of a plurality of buffers. The motor drive unit 28 comprises a stepping motor 24. In addition, although the CPU 25 and the ASIC 27 are contained in the control unit 11 shown in FIG. 1, they are separately illustrated so as to be easily understood in FIG. 4. In addition, In FIG. 4, a solid arrow designates a data write signal, a dotted arrow designates a data write request signal, and a thick arrow designates a pulse output signal.

The CPU 25 outputs the data write signal to the ASIC 27 and writes data in each buffer of the buffer group 29 provided in the ASIC 27. Here, the CPU 25 serves as a write unit. The write unit includes a first mode in which data is written in the buffer in a process performed in a predetermined order, and a second mode in which data is written in the buffer when a read unit to be described below requests for data writing. Its detailed description will be made below.

The data means pulse cycle data showing a cycle to output a pulse for driving the stepping motor. More specifically, the data contains a pulse width of the pulse to be outputted and the number of outputs of the pulse having that pulse width. The data written in one buffer is for one step for rotating the stepping motor 24 to a certain angle and when the buffer group 29 has eight buffers, for example, the data for eight steps are written in the eight buffers, respectively step by step. In the case where the speed of the stepping motor 24 is changed, multiple data having different pulse widths are written in each buffer.

The ASIC 27 reads the data in the buffer group 29 written by the CPU 25. Here, the ASIC 27 serves as a read unit. Thus, it outputs a pulse to the motor drive unit 28 based on the read data. In addition, after the ASIC 27 has read all data in the buffer group 29, it outputs the data write request signal to the CPU 25 and requests the CPU 25 to write the data. When the CPU 25 receives the request, it outputs the data write signal to the ASIC 27 to write the data in the buffer group 29.

The motor drive unit 28 rotates the stepping motor 24 based on the pulse outputted from the ASIC 27. The stepping motor 24 rotates a feeding roller (not shown) that abuts on and transports the sheet 44.

Thus, the stepping motor control device 26 controls the stepping motor 24. More specifically, at the time of driving the stepping motor 24, a speed up control in which the rotation speed of the stepping motor 24 is gradually increased and a slow down control in which the rotation speed of the stepping motor 24 is gradually decreased are performed in some cases. In this case, the multiple data having the different pulse widths are needed in a short time. Thus, the CPU 25 writes the data having the different pulse widths in each buffer. Then, the ASIC 27 reads the data and outputs the pulses having the different pulse widths based on the data. The motor drive unit 28 finely changes the speed of the stepping motor 24 based on the pulses having the different pulse widths. Thus, the speed up control and the slow down control of the stepping motor 24 are smoothly performed.

Figure 5:
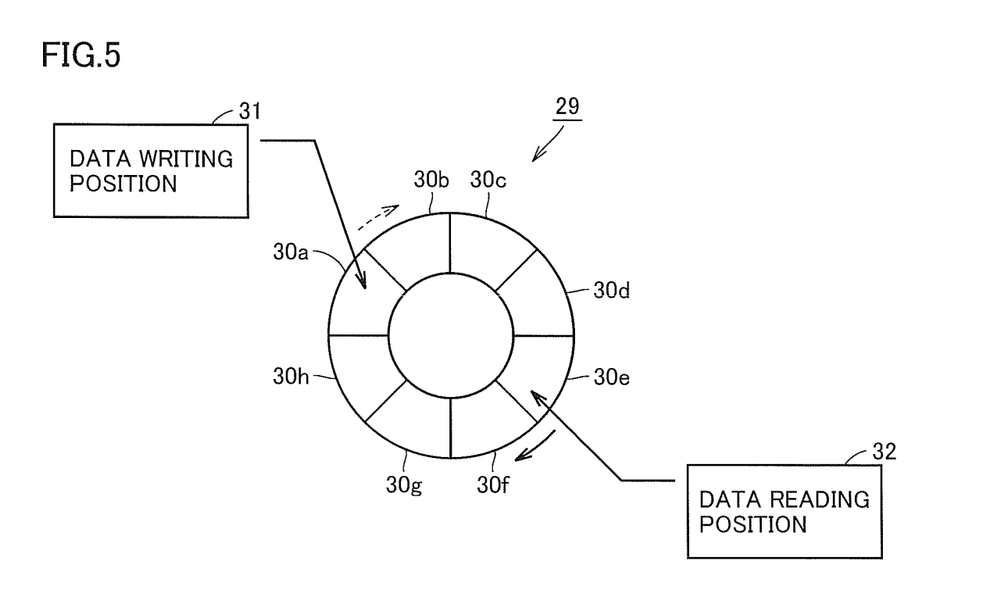
FIG. 5 is a view showing the construction of a buffer group provided in an ASIC.

FIG. 5 is a view showing the construction of the buffer group 29 provided in the ASIC 27. Referring to FIG. 5, the buffer group 29 comprises eight buffers 30a to 30h in this embodiment. The data for driving the stepping motor is stored in each of the buffers 30a to 30h, the data is written by the CPU 25, and the data is read by the ASIC 27. The data writing and the data reading are performed in a ring buffer mode.

More specifically, the data writing is started from the buffer 30a and ends at the buffer 30h, and then the data writing is started from the buffer 30a again continuously. Similarly, the data reading is started from the buffer 30a and ends at the buffer 30h, and then the data reading is started from the buffer 30a again continuously.

In the data writing, the buffer in which the data can be written is determined based on a write position register 31 designating the buffer to be used for data writing. Here, the CPU 25 serves as a write buffer determination unit. After the data is written in the buffer designated by the write position register 31, the next buffer is designated.

In addition, similarly, in the data reading, the buffer in which the data can be read is determined based on a read position register 32 designating the buffer to be used for data reading. Here, the ASIC 27 serves as a read buffer determination unit. After the data is read from the buffer designated by the read position register 32, the next buffer is designated. In addition, in FIG. 5, a dotted arrow designates the moving direction of the write position register 31 and a solid arrow designates the moving direction of the read position register 32.

As shown in FIG. 5, when the write position register 31 designates the buffer 30a and the read position register 32 designates the buffer 30e, the CPU 25 determines that the data can be written from the buffer 30a to the buffer 30d. That is, the buffers 30a to 30d are determined that the data have been read and the data has not been written yet. Thus, the ASIC 27 determines that the data can be read from the buffer 30e to 30h. That is, the buffers 30e to 30h are determined that the data has been written and the data has not been read yet.

Thus, when the data is written and read as described above, the data writing and reading can be performed only by referring to the write position register 31 and the read position register 32. Therefore, the data can be written and the data can be read easily and efficiently, so that the load on the CPU 25 can be reduced.

In addition, since the data is written and the data is read in the ring buffer mode, even when the data writing or the data reading is completed in the last buffer 30h, the data writing or the data reading can be continuously performed in the buffer 30a immediately. Therefore, the load on the CPU 25 can be reduced.

Figure 6:
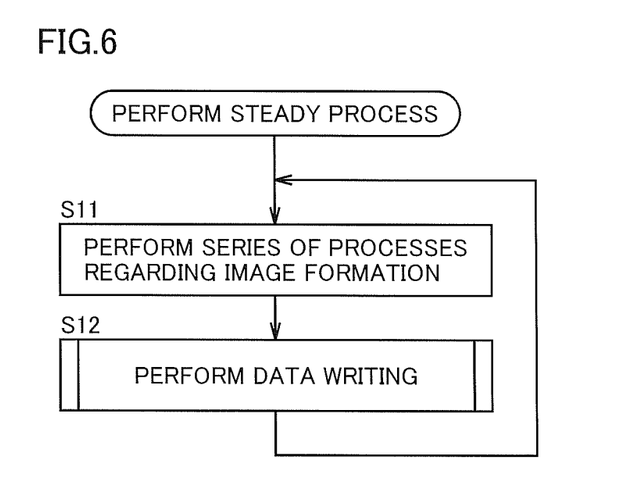
FIG. 6 is a flowchart showing a steady process of a CPU.

Here, the process of the CPU 25 when the data is written in the buffer will be described. FIG. 6 is a flowchart showing the steady process of the CPU 25. The steady process of the CPU 25 will be described with reference to FIGS. 1 to 6.

The CPU 25 performs the steady process normally. It receives the interrupt process according to need. The steady process includes the series of processes regarding the image formation in the multifunctional printer 10 such as the process for transporting the document by the document feeding device 14, the process for reading the image of the document by the image reading unit 15, the process for forming the image from the image data of the document by the image forming unit 16, and the process for transporting the sheet by the sheet transporting unit 23, and these processes are performed in the predetermined order.

Thus, the CPU 25 performs the series of processes regarding the image information in the steady process (step S11 in FIG. 6, the word "step" will be omitted hereinafter). In addition, the CPU 25 performs the data write process to write the data in the buffer in the steady process (S12).

Figure 7:
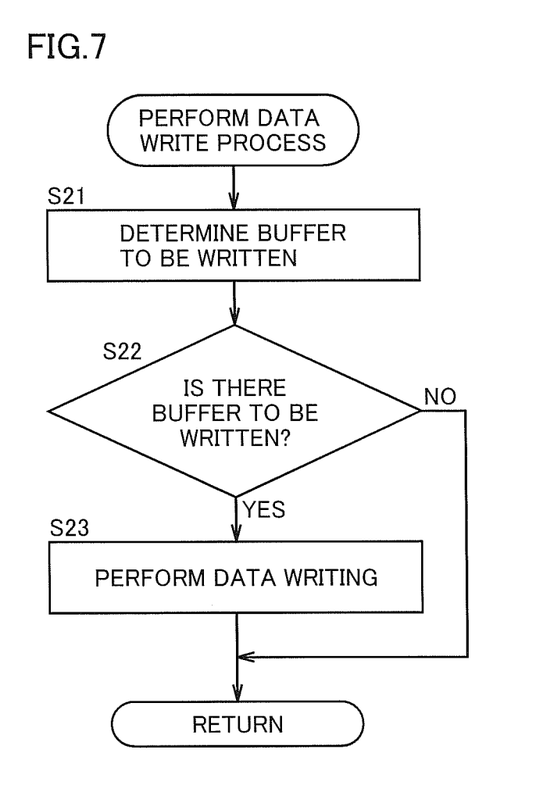
FIG. 7 is a flowchart showing a data write process.

Here, the data write process will be described. FIG. 7 is a flowchart showing the data write process. The data write process will be described with reference to FIGS. 1 to 7.

The CPU 25 determines the buffer in which the data can be written, from the buffers 30a to 30h, based on the write position register 31 (S21). In this embodiment, as shown in FIG. 5, the write position register 31 designates the buffer 30a and the read position register 32 designates the buffer 30e. Therefore, the buffers 30a to 30d are determined that the data can be written therein as described above.

Then, since there is a buffer in which the data can be written (YES at S22), the CPU 25 writes the data in the buffers 30a to 30d (S23). The data writing at this time corresponds to the first mode.

In addition, when there is no buffer in which the data can be written (NO at S22), the data write process is completed and the steady process is performed continuously.

Meanwhile, the ASIC 27 reads the data written by the CPU 25. At this time, when all the data in the buffer group 29 is read, the ASIC 27 outputs the data write request signal to the CPU 25 and requests the CPU 25 to write the data. In other words, it requests the interrupt process to the CPU 25.

Figure 8:
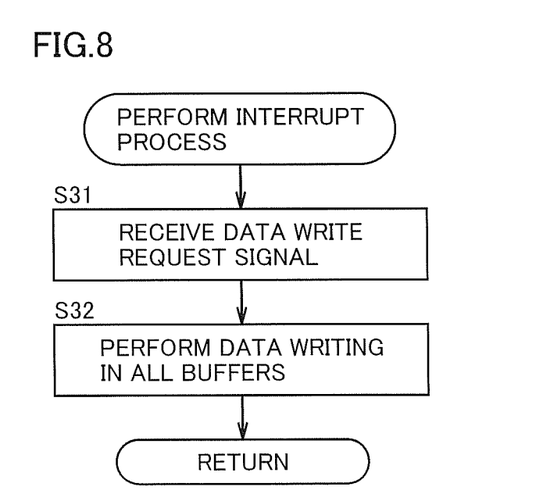
FIG. 8 is a flowchart showing an interrupt process.

FIG. 8 is a flowchart showing the interrupt process. The interrupt process will be described with reference to FIGS. 1 to 8.

The CPU 25 receives the data write request signal from the ASIC 27 (S31). Then, since the ASIC 27 has read all the data in the buffer group 29 here as described above, the CPU 25 writes the data in all the buffers from the buffer 30a to the buffer 30h (S32). Thus, according to the interrupt process, the data is written in response to the data write request from the ASIC 27. Thus, as described above, the process is requested to the CPU 25 after the ASIC 27 has read all the data in the buffer group 29. The interrupt process is requested at various timings such as when the series of processes regarding the image formation is completed as shown in the step 11 in FIG. 6, or when the buffer in which the data can be written is determined as shown in the step 21 in FIG. 7. In addition, the data writing at this time corresponds to the second mode.

Thus, the stepping motor control device 26 writes the data for driving the stepping motor through the steady process and writes the data through the interrupt process. As a result, the number of data writings can be reduced due to the interrupt process. Thus, the load on the CPU 25 can be reduced and the data can be written smoothly without any delay.

In addition, since the feeding motor 45 is the stepping motor 24 controlled by the stepping motor control device 26, the load on the CPU 25 can be reduced in the case where multiple data are needed in a short time such as the case of the speed up control and slow down control, so that the data can be written smoothly without any delay. Thus, the speed of the feeding motor 45 can be smoothly changed and the sheet can be appropriately transported.

In addition, since the multifunctional printer 10 comprises the stepping motor control device 26, the control quality of the stepping motor 24 is improved and a good image can be formed.

In addition, according to the control method of the stepping motor 24, the data for driving the stepping motor is written through the steady process and the data is written through the interrupt process. As a result, the number of data writings can be reduced due to the interrupt process. Thus, the load on the CPU 25 can be reduced and the data can be written smoothly without any delay.

In addition, although the description has been made of the case where the feeding motor 45 is the stepping motor 24 controlled by the stepping motor control device 26 in the above embodiment, the present invention is not limited to this and can be applied to a driving roller 47 that abuts on and rotates the transfer belt 41.

More specifically, the stepping motor 24 rotates the driving roller 47. The driving roller 47 abuts on the transfer belt 41 and rotates the transfer belt 41. The rotation speed of the transfer belt 41 is observed all the time and for example, observed all the time by detecting the rotation speed for a predetermined section of the transfer belt 41.

As described above, the full-color image is formed on the transfer belt 41 by overlapping the toner images of the several colors. Therefore, when the rotation speed of the transfer belt 41 is shifted from the predetermined rotation speed, the color shift is generated. In this case, since the clear full-color image cannot be formed, the rotation speed of the transfer belt 41 has to be kept constant.

However, it is difficult to keep the rotation speed constant in some cases because the slip between the transfer belt 41 and the roller for rotating the transfer belt 41, the aging deterioration of the transfer belt 41 and the difference in thickness caused by an error and the like at the time of manufacturing of the transfer belt 41. Thus, in order to keep the rotation speed of the transfer belt 41 constant and prevent the color shift, it is necessary to delicately control the roller that drives the transfer belt.

In this case, the stepping motor control device 26 corrects the rotation speed of the stepping motor 24 for rotating the driving roller 47. More specifically, the CPU 25 writes the multiple data having the different pulse widths in the buffer, based on the characteristics of the transfer belt 41. Thus, the ASIC 27 reads the data and outputs the pulses having different pulse widths based on the data. The motor driving unit 28 changes the speed of the stepping motor 24 based on the pulses having the different pulse widths. Thus, the rotation speed of the driving roller 47 is corrected and the rotation speed of the transfer belt 41 can be kept constant.

Thus, since the rotation speed can be delicately corrected based on the transfer belt 41, the rotation speed of the transfer belt 41 can be kept constant. Thus, the color shift is prevented and the clear full-color image can be formed.

In addition, the present invention can be applied to another motor such as a resistant motor, as long as the stepping motor 24 is used.

In addition, although the description has been made of the case where the data is written in the plurality of buffers 30a to 30d in the step 23 in FIG. 7 in the above embodiment, the data may be written in any one of the plurality of buffers.

Furthermore, although the description has been made of the case where the data is written and the data is read in the ring buffer mode in the above embodiment, the data may be written and read in another way. For example, the write position register 31 moves to any buffer other than the next buffer when the data writing is completed. Thus, the CPU 25 writes the data in that buffer. In addition, similarly, the read position register 32 moves to any buffer other than the next buffer when the data writing is completed. Thus, the ASIC 27 reads the data from that buffer.

In addition, although the description has been made of the case where the ASIC 27 requests the interrupt process to the CPU 25 to write data after all the data in the buffer group 29 have been read in the above embodiment, it may request the interrupt process to write the data after the data in the predetermined number of buffers have been read, which is found by detecting that the data in the predetermined number of buffers have been read.

In addition, the description has been made of the case where the data is written in all the buffers when the ASIC 27 outputs the write request signal in the interrupt process in the above embodiment, the data may be written in the two or more buffers determined that the data can be written.

Figure 9:
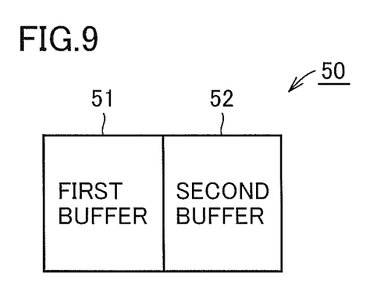
FIG. 9 is a view showing one example of a buffer group comprising two buffers.

In addition, although the buffer group 29 comprises eight buffers 30a to 30h in the above embodiment, the number is not limited to eight but may be two or more. FIG. 9 is a view showing an example of a buffer group 50 comprising two buffers. Referring to FIG. 9, the buffer group 50 comprises a first buffer 51 and a second buffer 52.

In addition, the description has been made of the case where the CPU 25 and the ASIC 27 are contained in the control unit 11 of the multifunctional printer 10 in the above embodiment, the CPU and the ASIC may be separately provided in the stepping motor control device. In this case, the stepping motor control device can be used as another device in which a motor is used.

In addition, the stepping motor may comprise the stepping motor control device 26. In this case, the stepping motor can reduce the load on the CPU and the data can be written smoothly without any delay.

Furthermore, although the description has been made of the case where the data is written in the steady process and the interrupt process in the above embodiment, when the steady process suffices for the data writing, the data may be written only in the steady process. In this case, the stepping motor control device 26 writes the data for driving the stepping motor in the steady process. Thus, since it is not necessary to write the data in the interrupt process, the load on the CPU can be reduced and the data can be written smoothly without any delay.

Furthermore, although the description has been made of the case where the multifunctional printer 10 forms the full-color image, it may form a black-and-white image.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

What is claimed is:

1. A stepping motor control device included in an image forming apparatus comprising:
    a CPU for performing a steady process normally including a series of processes regarding an image formation in the image forming apparatus in predetermined order and performing an interrupt process when said CPU receives a request for said interrupt process;
    a ring buffer having a plurality of buffers for storing pulse data, which contains a pulse width of a pulse to be outputted and the number of outputs of the pulse having the pulse width, for driving a stepping motor; and
    a read unit for reading pulse data from said ring buffer and outputting a pulse to a motor drive unit for driving said stepping motor based on the read pulse data;
    wherein said CPU determines, from a buffer designated by a write position register to the buffer preceding the buffer designated by a read position register along a predetermined circular moving direction of said write and read position registers among said plurality of buffers as a buffer in which pulse data can be written, in said steady process;
    and
    said CPU writes pulse data in said determined buffer when said CPU determines there is a buffer in which pulse data can be written and performs the series of processes regarding the image formation when said CPU determines there is no buffer in which pulse data can be written, in said steady process, and writes pulse data in all the plurality of buffers in said interrupt process when said CPU receives said request for said interrupt process;
    wherein said read unit determines from a buffer designated by the read position register to the buffer preceding the buffer designated by the write position register along said predetermined circular moving direction among said plurality of buffers as a buffer from which pulse data can be read, while said steady process is performed by said CPU; and
    said read unit reads pulse data from the determined buffer when said read unit determines there is a buffer from which pulse data can be read, and outputs said request for said interrupt process to said CPU when said read unit determines there is no buffer from which pulse data can be read.

2. An image forming apparatus comprising the stepping motor control device according to claim 1.

3. The image forming apparatus according to claim 2 comprising:
    an image forming unit for forming an image;
    a feeding roller for transporting a sheet to said image forming unit; and
    a stepping motor for rotating said feeding roller;
    wherein said stepping motor is controlled by said stepping motor control device.

4. The image forming apparatus according to claim 3, wherein said stepping motor control device controls said feeding roller rotated by said stepping motor so as to speed up and slow down.

5. The image forming apparatus according to claim 2, further comprising:
    a transfer belt for forming a visible image thereon by rotation; and
    a stepping motor for rotating said transfer belt, wherein said stepping motor is controlled by said stepping motor control device.

6. The image forming apparatus according to claim 5, wherein said stepping motor control device controls the rotation speed of said transfer belt rotated by said stepping motor so as to keep the speed constant.

7. A stepping motor comprising the stepping motor control device according to claim 1.

8. A method for controlling a stepping motor included in an image forming apparatus by reading pulse data written in a ring buffer having a plurality of buffers with a read unit comprising:
    a write step of writing pulse data for driving the stepping motor in the plurality of buffers,
    wherein the write step includes a step of writing pulse data in said ring buffer in a steady process performed by a CPU in a predetermined order including a series of processes regarding an image formation in the image forming apparatus, and a step of writing pulse data in said ring buffer in an interrupt process performed when said CPU receives a request for said interrupt process from the read unit; and the write step further includes a step of determining based on a write position register and a read position register, among said plurality of buffers, from a buffer designated by the write position register to a buffer preceding a buffer designated by the read position register along a predetermined circular moving direction of the write and read position registers among said plurality of buffers as a buffer in which pulse data can be written, in said steady process, a step of writing pulse data in said determined buffer when it is determined there is a buffer in which pulse data can be written and performing the series of processes regarding the image formation when it is determined there is no buffer in which pulse data can be written, and further includes a step of writing pulse data in all of said plurality of buffers in said interrupt process; and further comprising:

a read step of determining from a buffer designated by the read position register to the buffer preceding the buffer designated by the write position register along said predetermined circular moving direction among said plurality of buffers as a buffer from which pulse data can be read, while said steady process is performed by said CPU, based on said write position register and said read position register, among said plurality of buffers;

reading pulse data from the determined buffer when said read unit determines there is a buffer from which pulse data can be read; and outputting said request for said interrupt process to said write unit when there is no buffer from which data can be read, as a result of the read step determination.

9. The stepping motor control device according to claim 1, wherein:

said read unit determines buffers from which pulse data can be read, based on said read position register and said write position register, among said plurality of buffers, from the buffer designated by the read position register to the buffer preceding the buffer designated by the write position register along the predetermined circular moving direction of the read position register.

\* \* \* \* \*

UNITED STATES PATENT AND TRADEMARK OFFICE
CERTIFICATE OF CORRECTION

| | | |
|---|---|---|
| PATENT NO. | : 8,804,212 B2 | Page 1 of 1 |
| APPLICATION NO. | : 12/125660 | |
| DATED | : August 12, 2014 | |
| INVENTOR(S) | : Ryu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1240 days.

Signed and Sealed this
Fifteenth Day of September, 2015

Michelle K. Lee
*Director of the United States Patent and Trademark Office*